US006283504B1

(12) United States Patent
Stanley et al.

(10) Patent No.: US 6,283,504 B1
(45) Date of Patent: Sep. 4, 2001

(54) OCCUPANT SENSOR

(75) Inventors: James G. Stanley, Novi; Robert A. Stopper, Jr., Plymouth, both of MI (US)

(73) Assignee: Automotive Systems Laboratory, Inc., Farmington Hills, MI (US)

( * ) Notice: Subject to any disclaimer, the term of this patent is extended or adjusted under 35 U.S.C. 154(b) by 0 days.

(21) Appl. No.: 09/474,673

(22) Filed: Dec. 29, 1999

Related U.S. Application Data

(60) Provisional application No. 60/114,269, filed on Dec. 30, 1998, provisional application No. 60/133,630, filed on May 11, 1999, provisional application No. 60/133,632, filed on May 11, 1999, and provisional application No. 60/143,761, filed on Jul. 12, 1999.

(51) Int. Cl.$^7$ .................................................. B60R 21/32
(52) U.S. Cl. .................. 280/735; 180/272; 340/562; 297/217.2
(58) Field of Search ..................... 280/735; 180/272, 180/273; 340/562; 297/217.2

(56) References Cited

U.S. PATENT DOCUMENTS

| | | | |
|---|---|---|---|
| 3,111,608 | 11/1963 | Boenning et al. | 361/179 |
| 3,177,481 | 4/1965 | Joy et al. | 246/167 R |
| 3,237,105 | 2/1966 | Kalmus | 340/562 |
| 3,324,848 | 6/1967 | Domeier et al. | 600/535 |
| 3,439,358 | 4/1969 | Salmons | 340/552 |
| 3,740,567 | 6/1973 | Atkins | 307/10 SB |
| 3,898,472 | 8/1975 | Long | 307/10 SB |
| 3,943,376 | 3/1976 | Long | 307/116 |
| 4,300,116 | 11/1981 | Stahovec | 340/32 |
| 4,430,645 | 2/1984 | Eskandry et al. | 340/572 |
| 4,625,329 | 11/1986 | Ishikawa et al. | 382/1 |
| 4,796,013 | 1/1989 | Yasuda et al. | 340/562 |
| 4,831,279 | 5/1989 | Ingraham | 307/116 |
| 4,887,024 | 12/1989 | Sugiyama et al. | 324/61 R |

(List continued on next page.)

OTHER PUBLICATIONS

Fink, Donald G. and Beaty, H.W.; Standard Handbook for Electrical Engineers 12th ed., McGraw–Hill Book Co, 1987, pp. 3–57 through 3–65.

Smith, J.R.; "Field Mice: Extracting hand geometry from electric field measurements", IBM Systems Journal, vol. 35. Nos. 3&4, 1996, pp. 587–608.

Reference Data for Engineers: Radio, Electronics, Computer, and Communications 7th edition, E.C. Jordon editor in chief, Howard W. Sams, 1985, pp. 12–3 through 12–12.

H. Philipp, "The Charge Transfer Sensor", Sensors magazine, Nov., 1996, pp. 36–42.

Jinno, K.; Ofuji M.; Saito, T.; Sekido, S.; "Occupant Sensing Utilizing Perturbation of Electric Fields", SAE 971051, Reprinted from: Anthropomorphic Dummies and Crash Instrumentation Sensors (SP–1261), SAE International Congress & Exposition, Detroit, MI Feb. 24–27, 1997, pp. 117–129.

*Primary Examiner*—Peter C. English
(74) *Attorney, Agent, or Firm*—Dinnin & Dunn, P.C.

(57) ABSTRACT

An electric field sensor comprises at least one electrode mountable in a vehicle seat and a sensing circuit operatively coupled to the electrode, wherein the at least one electrode at least partially bounds at least one region that is proximate to an object such as an infant seat, a child seat, or a booster seat, for which the sensitivity of the sensor is preferably reduced. The at least one region without a conductive electrode may comprise a plurality of regions, and at least one of the regions may extend laterally across the seat. Furthermore, a plurality of electrodes may be incorporated, each having a different sensitivity to particular objects to be sensed, wherein an overall capacitance measurement that is dominated by the capacitance of the particular electrode that is most sensitive to the particular object can be used to indicate the presence of that object.

11 Claims, 3 Drawing Sheets

U.S. PATENT DOCUMENTS

| | | | |
|---|---|---|---|
| 4,980,519 | 12/1990 | Mathews | 178/19 |
| 5,071,160 | 12/1991 | White et al. | 280/735 |
| 5,118,134 | 6/1992 | Mattes et al. | 280/735 |
| 5,166,679 | 11/1992 | Vranish et al. | 340/870.37 |
| 5,214,388 | 5/1993 | Vranish et al. | 324/683 |
| 5,247,261 | 9/1993 | Gershenfeld | 324/716 |
| 5,247,281 | 9/1993 | Facon et al. | 340/562 |
| 5,330,226 | 7/1994 | Gentry et al. | 280/735 |
| 5,373,245 | 12/1994 | Vranish | 324/662 |
| 5,398,185 | 3/1995 | Omura | 364/424.05 |
| 5,411,289 | 5/1995 | Smith et al. | 280/735 |
| 5,413,378 | 5/1995 | Steffens, Jr. et al. | 280/735 |
| 5,439,249 | 8/1995 | Steffens, Jr. et al. | 280/735 |
| 5,442,347 | 8/1995 | Vranish | 340/870.37 |
| 5,446,391 | 8/1995 | Aoki et al. | 324/661 |
| 5,446,661 | 8/1995 | Gioutsos et al. | 364/424.05 |
| 5,454,591 | 10/1995 | Mazur et al. | 280/735 |
| 5,474,327 | 12/1995 | Schousek | 280/735 |
| 5,482,314 | 1/1996 | Corrado et al. | 280/735 |
| 5,490,069 | 2/1996 | Gioutsos et al. | 280/735 |
| 5,515,933 | 5/1996 | Meyer et al. | 180/273 |
| 5,525,843 | 6/1996 | Howing | 307/9.1 |
| 5,528,698 | 6/1996 | Kamei et al. | 382/100 |
| 5,531,472 | 7/1996 | Semchena et al. | 280/735 |
| 5,539,292 | 7/1996 | Vranish | 318/568.21 |
| 5,549,323 | 8/1996 | Davis | 280/728.3 |
| 5,570,903 | 11/1996 | Meister et al. | 280/735 |
| 5,602,734 | 2/1997 | Kithil | 364/424.055 |
| 5,618,056 | 4/1997 | Schoos et al. | 280/735 |
| 5,626,359 | 5/1997 | Steffens, Jr. et al. | 280/735 |
| 5,636,864 | 6/1997 | Hori | 280/735 |
| 5,691,693 | 11/1997 | Kithil | 340/439 |
| 5,702,123 | 12/1997 | Takahashi et al. | 280/735 |
| 5,722,686 | 3/1998 | Blackburn et al. | 280/735 |
| 5,724,024 | 3/1998 | Sonderegger et al. | 340/562 |
| 5,726,581 | 3/1998 | Vranish | 324/688 |
| 5,730,165 | 3/1998 | Philipp | 137/1 |
| 5,770,997 | 6/1998 | Kleinberg et al. | 340/438 |
| 5,782,485 | 7/1998 | Takeda et al. | 280/735 |
| 5,793,176 | 8/1998 | Novak | 318/587 |
| 5,802,479 | 9/1998 | Kithil et al. | 701/45 |
| 5,835,613 | 11/1998 | Breed et al. | 382/100 |
| 5,844,415 | 12/1998 | Gershenfeld et al. | 324/663 |
| 5,844,486 * | 12/1998 | Kithil et al. | 280/735 |
| 5,845,000 | 12/1998 | Breed et al. | 382/100 |
| 5,871,232 | 2/1999 | White | 280/735 |
| 5,901,978 | 5/1999 | Breed et al. | 280/735 |
| 5,914,610 | 6/1999 | Gershenfeld et al. | 324/663 |
| 5,943,295 | 8/1999 | Varga et al. | 367/99 |
| 5,948,031 | 9/1999 | Jinno et al. | 701/45 |
| 5,954,360 * | 9/1999 | Griggs, III et al. | 280/735 |
| 5,964,478 | 10/1999 | Stanley et al. | 280/735 |
| 6,014,602 | 1/2000 | Kithil et al. | 701/45 |
| 6,024,378 | 2/2000 | Fu | 280/735 |
| 6,027,138 | 2/2000 | Tanaka et al. | 280/735 |
| 6,043,743 * | 3/2000 | Saito et al. | 280/735 |

* cited by examiner

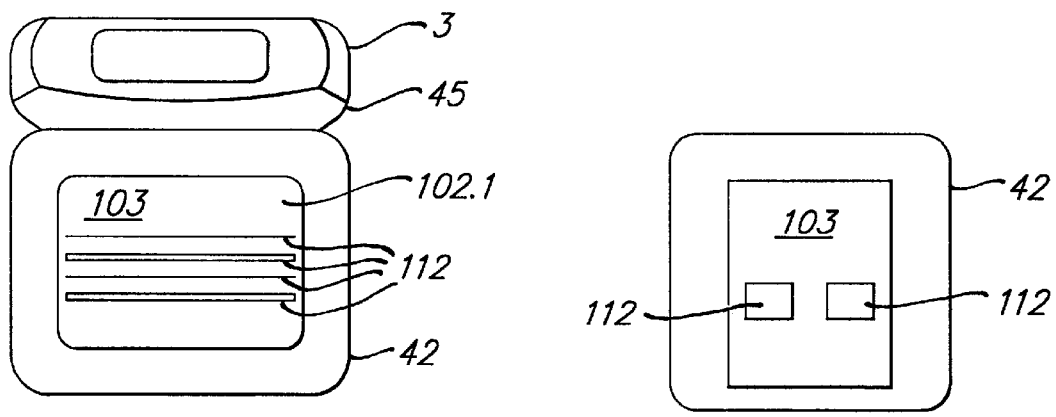
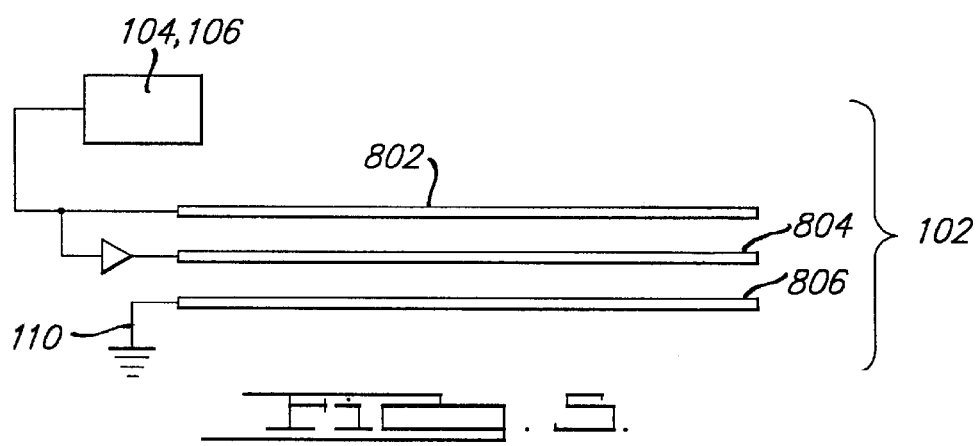
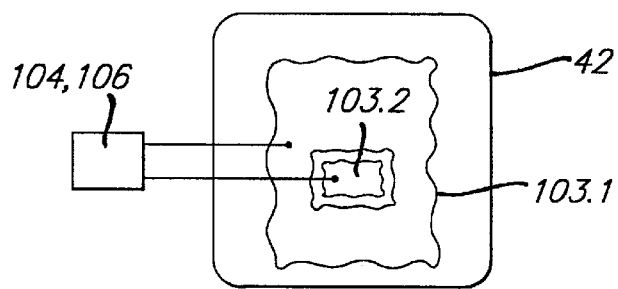

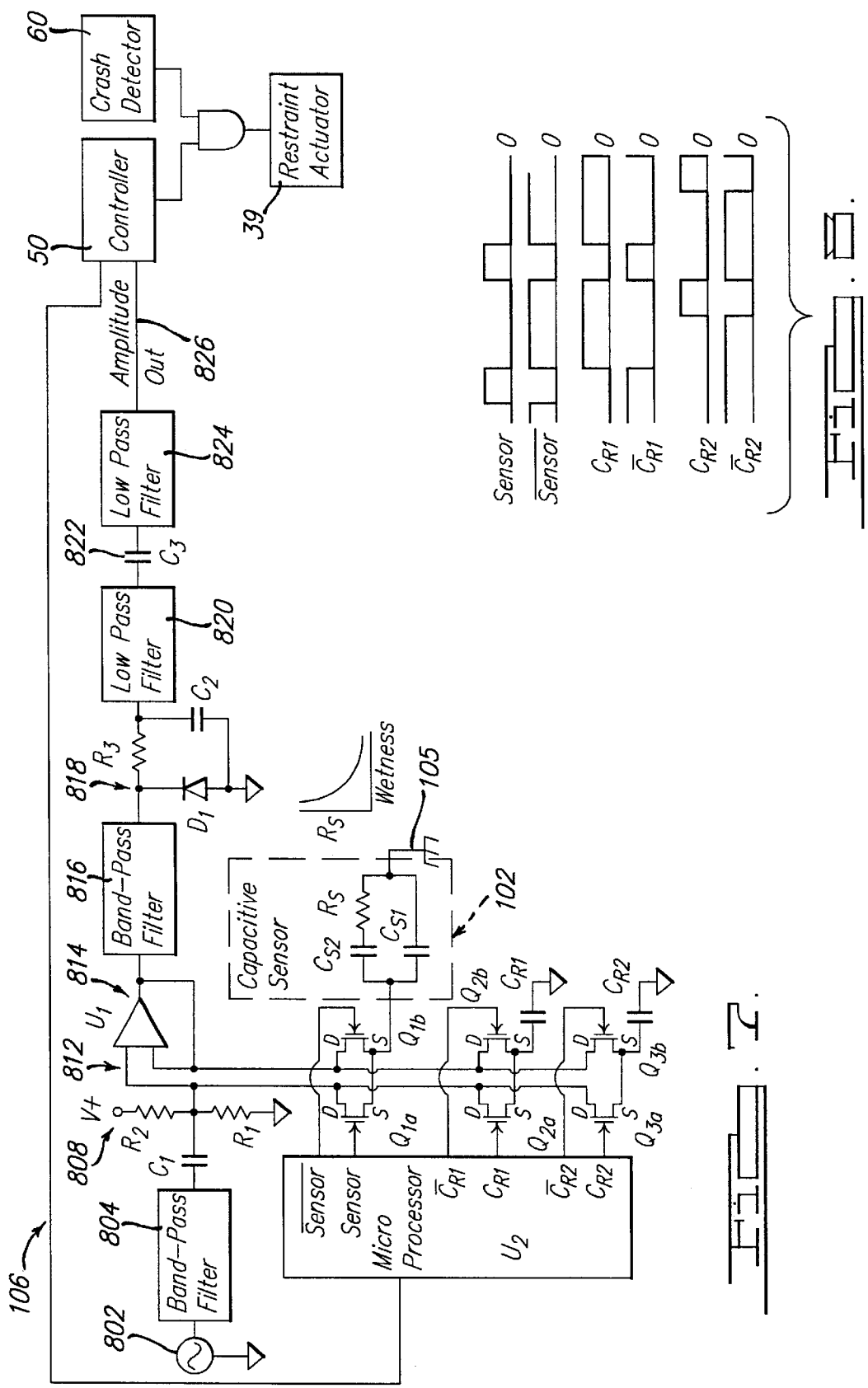

OCCUPANT SENSOR

CROSS-REFERENCE TO RELATED APPLICATIONS

The instant application claims the benefit of prior U.S. Provisional Application Ser. No. 60/114,269 filed on Dec. 30, 1998.

The instant application also claims the benefit of prior U.S. Provisional Application Ser. No. 60/133,630 filed on May 11, 1999.

The instant application also claims the benefit of prior U.S. Provisional Application Ser. No. 60/133,632 filed on May 11, 1999.

The instant application also claims the benefit of prior U.S. Provisional Application Ser. No. 60/143,761 filed on Jul. 12, 1999.

Co-pending, commonly owned U.S. application Ser. No. 09/474,600, filed on Dec. 29, 1999, discloses an occupant detection system comprising an electric field sensor in a seat bottom, and a range/proximity sensor for sensing the presence of an object in a region proximate to a restraint actuator of a safety restraint system.

Co-pending, commonly owned U.S. application Ser. No. 09/474,470, filed on Dec. 29, 1999, discloses an occupant detection system comprising an electric field sensor and a weight sensor in a seat bottom.

Co-pending, commonly owned U.S. application Ser. No. 09/474,473, filed on Dec. 29, 1999, discloses an occupant detection system comprising an electric field sensor in a seat bottom, and a range/proximity sensor for sensing an occupant proximate to a seat back.

Co-pending, commonly owned U.S. application Ser. No. 09/474,469 filed on Dec. 29, 1999, discloses an occupant sensor comprising an electric field sensor in a seat bottom, wherein the structure of the electric field sensor is adapted for improved consistency and for discriminating a wetness condition of the seat.

The above-identified applications are incorporated herein by reference.

TECHNICAL ART

The instant invention generally relates to occupant sensors for detecting an object on the seat of a vehicle, and, more particularly, to occupant sensors that are responsive to an electric field.

BACKGROUND OF THE INVENTION

A vehicle may contain automatic safety restraint actuators that are activated responsive to a vehicle crash for purposes of mitigating occupant injury. Examples of such automatic safety restraint actuators include air bags, seat belt pretensioners, and deployable knee bolsters. One objective of an automatic restraint system is to mitigate occupant injury, thereby not causing more injury with the automatic restraint system than would be caused by the crash had the automatic restraint system not been activated. Generally, it is desirable to only activate automatic safety restraint actuators when needed to mitigate injury because of the expense of replacing the associated components of the safety restraint system, and because of the potential for such activations to harm occupants. This is particularly true of air bag restraint systems, wherein occupants too close to the air bag it the time of deployment—i.e. out-of-position occupants—are vulnerable to injury or death from the deploying air bag even when the associated vehicle crash is relatively mild. For example, unbelted occupants subjected to severe pre-impact braking are particularly vulnerable to being out-of-position at the time of deployment. Moreover, occupants who are of small stature or with weak constitution, such as children, small adults or people with frail bones are particularly vulnerable to injury induced by the air bag inflator. Furthermore, infants properly secured in a normally positioned rear facing infant seat (RFIS) in proximity to a front seat passenger-side air bag are also vulnerable to injury or death from the deploying air bag because of the close proximity of the infant seat's rear surface to the air bag inflator module.

Yet another technique for mitigating injury to occupants by the air bag inflator is to control the activation of the inflator responsive to the presence and position of the occupant, thereby activating the inflator only when an occupant is positioned outside the associated at-risk zone of the inflator. NHTSA data suggests that severe injuries due to close proximity with the inflator can be reduced or eliminated if the air bag is disabled when the occupant is closer than approximately 4 to 10 inches from the inflator door. Such a system for disabling the air bag inflator requires an occupant sensor that is sufficiently sensitive and robust to make such a determination, while not causing the air bag inflator to be disabled when otherwise required for providing occupant restraint.

Except for some cases of oblique or side-impact crashes, it is generally desirable to not activate an automatic safety restraint actuator if an associated occupant is not present because of the otherwise unnecessary costs and inconveniences associated with the replacement of a deployed air bag inflation system. The prior art teaches various means for detecting the presence of an occupant, or the recognition of an inanimate object in the passenger-seat of a vehicle for purposes of implementing such a system. For example:, weight sensors can be incorporated into the seat to detect the presence of an occupant.

Yet another technique for mitigating injury to occupants by the air bag inflator is to control the inflation rate or inflation capacity of the air bag inflator responsive to presence and position of an occupant. Such a control system would most preferentially be used in conjunction with a controllable inflation system responsive to crash severity, such as described above, wherein the occupant position inputs can be used to override otherwise overly aggressive air bag inflator controls which might otherwise be indicated by the particular crash severity level but which could be injurious to occupants of small stature or weight, or to infants in rear facing infant seats. Such a system for controlling the air bag inflator requires an occupant position sensor that is robust and sufficiently accurate, and that can distinguish and discriminate various occupant seating configurations and conditions.

U.S. Pat. Nos. 5,071,160 and 5,118,134 teach the combination of sensing occupant position and/or velocity, and vehicle acceleration for purposes of controlling an inflator. Both of these patents teach by example the use of ultrasonic ranging to sense occupant position. U.S. Pat. No. 5,071,160 also teaches by example the use of a passive infrared occupant position sensor, while U.S. Pat. No. 5,118,134 teaches the use of a microwave sensor. U.S. Pat. No. 5,398,185 teaches the use of a plurality of occupant position sensors in a system for controlling safety restraint actuators in response thereto.

The prior art teaches the use of one or more ultrasonic beams reflected off the surface of an object to sense the location of the surface of the object. U.S. Pat. No. 5,330,226 teaches the combination of an ultrasonic ranging sensor mounted in the instrument panel and an overhead passive infrared sensor to sense occupant position for controlling a multi-stage air bag inflator or a vent valve connected thereto. U.S. Pat. Nos. 5,413,378, 5,439,249, and 5,626,359 teach ultrasonic sensors mounted in the dash and seat in combination with other seat sensors to detect the position and weight of the occupant for purposes of controlling an air bag inflator module. U.S. Pat. No. 5,482,314 teaches the combination of ultrasonic and passive infrared sensors together with associated signal processing for purposes of determining whether or not to deactivate a passive restraint system.

The prior art also teaches the use of infrared beams reflected off the surface of an object to sense the location of the surface of the object. U.S. Pat. Nos. 5,446,661, and 5,490,069 teach an infrared beam directed by a transmitter at a point of reflection on the object. A receiver detects the radiation scattered from the point of reflection, and measures the distance of the point of reflection from the transmitter based upon a triangulation of the transmitted and received beams for purposes of controlling the activation of a safety restraint system. These patents also teach the combination of an infrared beam occupant position sensor with an acceleration sensor for purposes of controlling an air bag inflation system. U.S. Pat. No. 5,549,323 teaches the incorporation of a light beam occupant sensor into an air bag door. Furthermore, infrared beam sensors are commonly used as range-finders in automatic focusing cameras.

The prior art of U.S. Pat. Nos. 4,625,329, 5,528,698, and 5,531,472 teach the use of imaging systems to detect occupant position, the later two of which use this information for purposes of controlling an air bag inflator. U.S. Pat. Nos. 5,528,698, 5,454,591, 5,515,933, 5,570,903, and 5,618,056 teach various means of detecting the presence of a rear facing infant seat for purposes of disabling an associated air bag inflator.

The prior art also teaches the use of capacitive sensing to detect the presence, proximity, or position of an occupant. U.S. Pat. No. 3,740,567 teaches the use of electrodes incorporated into the base and back of the seat respectively, together with a capacitance responsive circuit, for purposes of discriminating between human occupants and animals or packages resting on an automobile seat. U.S. Pat. No. 3,898,472 teaches an occupant detection apparatus which includes a metallic electrode which is disposed to cooperate with the body of an automobile to form an occupant sensing capacitor, together with related circuitry which senses variations in the associated capacitance responsive to the presence of an occupant. U.S. Pat. No. 4,300,116 teaches the use of a capacitive sensor to detect people proximate the exterior of a vehicle. U.S. Pat. No. 4,796,013 teaches a capacitive occupancy detector wherein the capacitance is sensed between the base of the seat and the roof of the vehicle. U.S. Pat. No. 4,831,279 teaches a capacitance responsive control circuit for detecting transient capacitive changes related to the presence of a person. U.S. Pat. Nos. 4,980,519 and 5,214,388 teach the use of an array of capacitive sensors for detecting the proximity of an object. U.S. Pat. No. 5,247,261 teaches the use of an electric field responsive sensor to measure the position of a point with respect to at least one axis. U.S. Pat. No. 5,411,289 teaches the use of a capacitive sensor incorporated into the back rest of the seat to detect occupant presence. U.S. Pat. No. 5,525,843 teaches the use of electrodes incorporated into the base and back of the seat for purpose of detecting the presence of an occupant, whereby the electrodes are substantially insulated from the vehicle chassis when the detection circuit is active. U.S. Pat. Nos. 5,602,734 and 5,802,479 teach an array of electrodes mounted above the occupant for purposes of sensing occupant position based upon the influence of the occupant on the capacitance among the electrodes. U.S. Pat. No. 5,166,679 teaches a capacitive proximity sensor with a reflector driven at the same voltage as the sensing element to modify the sensing characteristic of the sensor. U.S. Pat. No. 5,770,997 teaches a capacitive vehicle occupant position sensing system wherein the sensor generates a reflected electric field for generating an output signal indicative of the presence of an object. U.S. Pat. Nos. 3,943,376, 3,898,472, 5,722,686, and 5,724,024 also teach capacitive-based systems for sensing occupants in motor vehicles.

In addition to methods taught by the above referenced U.S. Patents, the prior art also teaches various means of measuring capacitance, as for example given in the *Standard Handbook for Electrical Engineers* $12^{th}$ edition, D. G. Fink and H. W. Beaty editors, McGraw Hill, 1987, pp. 3–57 through 3–65 or in Reference Data for Engineers: Radio. Electronics, Computer, and Communications $7^{th}$ edition, E. C. Jordon editor in chief, Howard W. Sams, 1985, pp. 12–3 through 12–12, both included herein by reference.

The technical paper "Field mice: Extracting hand geometry from electric field measurements" by J. R. Smith, published in IBM Systems Journal, Vol. 35, Nos. 3 & 4, 1996, pp. 587–608, incorporated herein by reference, describes the concept of Electric Field Sensing as used for making non-contact three-dimensional position measurements, and more particularly for sensing the position of a human hand for purposes of providing three dimensional positional inputs to a computer. What has commonly been referred to as capacitive sensing actually comprises the distinct mechanisms of what the author refers to as "loading mode", "shunt mode", and "transmit mode" which correspond to various possible electric current pathways. In the shunt mode, a voltage oscillating at low frequency is applied to a transmit electrode, and the displacement current induced at a receive electrode is measured with a current amplifier, whereby the displacement current may be modified by the body being sensed. In the "loading mode", the object to be sensed modifies the capacitance of a transmit electrode relative to ground. In the transmit mode, the transmit electrode is put in contact with the user's body, which then becomes a transmitter relative to a receiver, either by direct electrical connection or via capacitive coupling.

In one embodiment, a plurality of capacitive sensors are used to sense distances to the occupant, which in combination with the known locations of the fixed sensor elements are triangulated to locate the position of the occupant. One problem with such capacitive sensor arrangements is that they make use of the dielectric constant of known stability to detect the distance between a sensor and the occupant. Furthermore, the occupant position measurement tends to be associated with the center of mass of the sensed object. However, the sensor can be confused by large metal devices or arms/limbs in close proximity. Therefore, while these sensors may perform satisfactorily as an automatic "on/off" switch to either disable the air bag inflator based upon occupant position, or enable the air bag inflator to be fired responsive to the activation signal from the vehicle crash sensor, the present embodiments of capacitive occupant position sensors may not be sufficiently accurate and robust to provide for controllable inflation based upon occupant position.

Occupant sensing systems that use capacitive sensors have significant problems when the sensor is wet and especially when the water near the sensor has good coupling to ground. The frequency dependent response of wet objects is discussed in an article describing capacitive sensing techniques by H. Philipp, entitled "The Charge Transfer Sensor", from the November, 1996 issue of Sensors magazine, incorporated by reference herein. One prior-art capacitive sensing system that uses sensors in the seat back and the seat bottom reportedly has problems because the seat back angle creates changes in the sensor signals independent of the occupant situation.

Sensors which measure the distance between a point of reference and the surface of an object, such as ultrasonic or infrared beam sensors, are also vulnerable to false measurements, as would be caused for example by the presence of the extremities of an occupant, or by the presence of an object such as a scarf or newspaper held thereby, in proximity to the sensor. These types of sensors could be used to monitor the at-risk zone proximate the inflator door, but are subject to several disadvantages. In particular, infrared based systems usually incorporate a beam much narrower than the volume of the at-risk zone such that multiple beams may be required to reliably sense an object anywhere inside the at-risk zone. The incorporation of multiple beams results in extra cost, complexity, and potentially slowed response. Furthermore, both infrared beam and ultrasonic base sensors would require a significant amount of hardware proximate the inflator door if the at-risk zone proximate the inflator is to be monitored.

Some prior-art occupant detection systems attempt to identify the type of occupant or object in the passenger side seat, for example to discriminate a rear facing infant seat from a normally seated adult in the passenger seat. This is a very challenging task as there are a large variety of possible situations. Sensor systems that use distance measurements to identify occupant situations attempt to use information about relatively few points in space to identify the type of occupant in the seat from among many possibilities. Since the outer surface of any particular situation can change dramatically by doing something as simple as tossing a blanket over the occupant or changing the seat position, results are sometimes unreliable. Sensing systems that use some form of range sensing across significant distances within the occupant compartment can be blocked by objects such as newspapers, maps or floating balloons. Some occupant detection systems incorporate a complex. algorithm that, while sometimes compensating for the lack of direct sensory information, can cause unpredictable or anomalous performance.

One disadvantage of many occupant detection systems is that they do not gather the most relevant information to determine if the occupant is in an at-risk zone around the inflator module. Occupant detection systems that are mounted above the passenger and look down on the seat area have the wrong physical perspective to directly monitor the region around the inflator door. Even if an ideal set of roof mounted sensors can reliably determine the occupants gross position—which is a very challenging task,—the actual volume between the inflator door and the occupant may be blocked to the sensors by the occupants body. If the criteria for controlling the activation of an air bag inflator were in part based on the proximity of the occupant's body to the air bag inflator door, then overhead sensors simply cannot reliably obtain the relevant information. Systems that only use ultrasonic and optical sensing mechanisms can be blocked by newspapers. Ultrasonic sensors in some configurations will be affected by environmental conditions (temperature, humidity, altitude) because the speed of sound changes depending on the environment. Any sensing system that needs a clear line of sight between the sensor and the occupant requires the sensor to be visible to the occupant.

NHTSA recommends the use of towels under child seats to make them stable. Some prior-art sensing systems discriminate between child seats and occupants seated directly on the seat by their corresponding pressure patterns. A towel, or other object, placed under a child seat could make the child seat's pressure pattern appear like an occupant seated directly on the seat, but would have relatively little effect on the electric field sensor of the capacitive sensing subsystem.

Another problem with some prior-art occupant detection systems is their inability to disable the air bag during a pre-impact breaking event.

SUMMARY OF THE INVENTION

The instant invention overcomes the above-noted problems by providing an occupant sensor comprising an electric field sensor comprising at least one electrode mountable in a vehicle seat and a sensing circuit operatively coupled to the electrode, wherein the at least one electrode at least partially bounds at least one region that is proximate to an object such as an infant seat, a child seat, or a booster seat, for which the sensitivity of the sensor is preferably reduced. The at least one region without a conductive electrode may comprise at plurality of regions, and at least one of the regions may extend laterally across the seat. Furthermore, a plurality of electrodes may be incorporated, each having a different sensitivity to particular objects to be sensed, wherein an overall capacitance measurement that is dominated by the capacitance of the particular electrode that is most sensitive to the particular object can be used to indicate the presence of that object.

Accordingly, one object of the instant invention is to provide an improved electric field sensor that provides improved discrimination of rear facing infant seats, child seats, and booster seats from normally seated occupants.

Another object of the instant invention is to provide improved immunity to a wetting of the seat by a liquid.

The capacitive sensing subsystem comprises a capacitive sensor in the seat bottom for detecting whether there is a large body immediately above the seat bottom cover as, for example, opposed to a child seat mounted on the passenger seat. The capacitive sensing subsystem disables the air bag whenever no forward facing occupant is detected near the seat bottom, as would occur when any child seat (including RFIS, forward facing child seats and booster seats) is present on the seat, or when the seat is empty. Accordingly, the capacitive sensing subsystem provides a simple direct measure of whether there is a normally seated forward facing occupant in the front passenger seat. The capacitive sensor in the seat bottom has a short range and only senses an occupant when a large surface of the occupant is very close to the sensor. Occupants normally seated directly on the seat cover always have a large surface of their body very close to the sensor. Infants or children in child seats have all, or most, of their body elevated several inches off the seat bottom surface which has relatively little effect on the sensor, whereby a failure to detect a normally seated occupant causes the air bag to be disabled. The capacitive sensing subsystem senses characteristics of the normally seated occupant that are readily distinguished from a child in a child seat on the passenger seat. This method of sensing is highly advantageous in that the sensor signal is dependent on the dielectric characteristics; of the passenger and does not simply sense the outer profile of the occupant in the same way optical or ultrasonic sensors do, which profile can change dramatically simply by throwing a blanket over the occupant or changing the seat position. This is even true of an empty seat situation. The dielectric characteristics proximate the seat bottom are relatively unaffected by changes in the profile of occupants and objects on the seat, such as caused by blankets as illustrated hereinabove. The sensor moves with the seat bottom so seat position or seat back angle do not affect the deployment decision.

One potential source of ambiguous signals from the capacitive sensing subsystem is the presence of water under a child seat. One way of mitigating this problem is by sensing at frequencies such that the path from the water above the sensor to ground does nct significantly effect the sensor's response. Another way of mitigating this problem is to use a driven shield and grounded shield under the sensor such that water trapped in the foam under the sensor doesn't effect the signal. Accordingly, the instant invention provides improved immunity to wet seat conditions, in comparison with prior-art capacitive sensors.

These and other objects, features, and advantages of the instant invention will be more fully understood after reading the following detailed description of the preferred embodiment with reference to the accompanying drawings.

BRIEF DESCRIPTION OF THE DRAWINGS

FIG. 3A and FIG. 3B illustrate various capacitive sensor pads in accordance with the instant invention.

FIG. 4 illustrates an alternate capacitive sensor pad in accordance with the instant invention.

FIG. 5 illustrates an embodiment of a capacitive sensor in accordance with the instant invention.

FIG. 6 illustrates a capacitive sensor comprising a plurality of electrodes.

FIG. 7 illustrates a sensing circuit in accordance with the instant invention.

FIG. 8 illustrates the operation of various elements of the sensing circuit of FIG. 7.

DETAILED DESCRIPTION OF THE PREFERRED EMBODIMENT(S)

Figure 1:
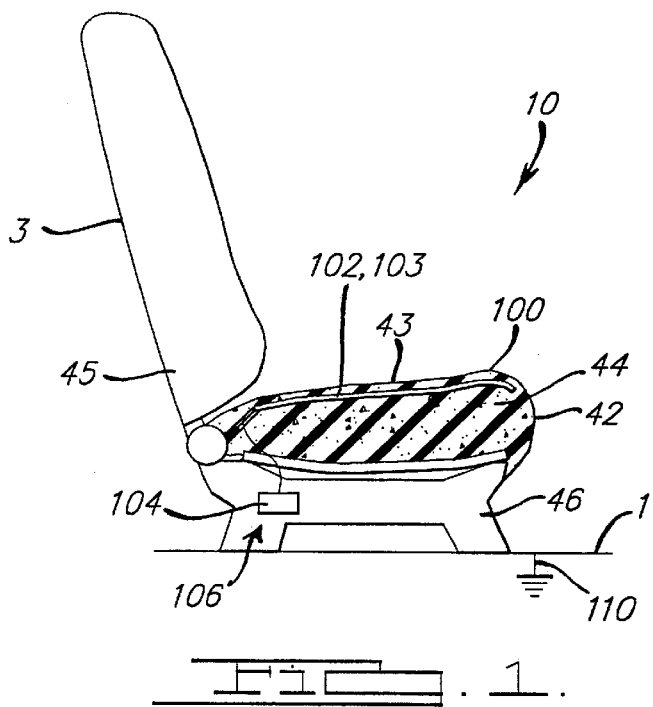
FIG. 1 illustrates a vehicle seat incorporating a capacitive sensor in accordance with the instant invention.

Referring to FIG. 1, an occupant sensor 10 comprises an electric field sensor 100 for identifying whether there is a normally seated, forward facing occupant on the seat 3 of a motor vehicle 1. The electric field sensor 100 is placed in the seat bottom 42 under the seat cover 43 and close to the top of the seat foam 44. Typically, the electric field sensor 100 is located in the seat bottom 42 of the passenger seat 3, although it may also be located in other seat locations where a child seat, that would need to be detected, might be located. The electric field sensor 100 comprises a capacitive sensing pad 102 connected to an electronics module 104 containing a sensing circuit 106 necessary to measure the capacitance of the capacitive sensing pad 102 relative to a circuit ground 110, then make a deployment enable/disable decision for a safety restraint system 38 such as an air bag inflator, and communicate this decision to a controller 50 for controlling the activation of the safety restraint system 38. The capacitive sensing pad 102 comprises at least one electrode 103, at least one of which is connected to the sensing circuit 106.

In operation, an occupant seated on the seat bottom 42 of seat 3 sufficiently increases the capacitance of the electric field sensor 100 so as to indicate the presence of the occupant. The capacitive sensing pad 102 is adapted so as to be substantially responsive to large objects, such as normally seated adults, on the seat bottom 42 for which an air bag restraint system would be beneficial in a crash, and to be substantially non-responsive to objects such as rear facing infant seats, child seats, and booster seats on the vehicle seat, for which an air bag restraint system would not be beneficial in a crash.

The electric field sensor 100 operates at frequencies, or with pulse lengths, such that materials or objects that respond slowly—for example a wet seat cover with a conductive path to ground—will not be sensed. In a continuous wave (CW) system, the excitation signal comprises a continuous sinusoidal or square wave signal for determining the capacitance of the capacitive sensing pad 102. Typically, excitation frequencies used in a continuous wave systems are above 1 MHz. The electric field sensor 100 is shielded from sensing water or other objects below it in the seat 3 by using a driven shield immediately under the sensor electrode and a ground plane below that.

The capacitive sensing pad 102 can be located elsewhere, for example in the seat back 45, for other occupant sensing applications.

Figure 2:
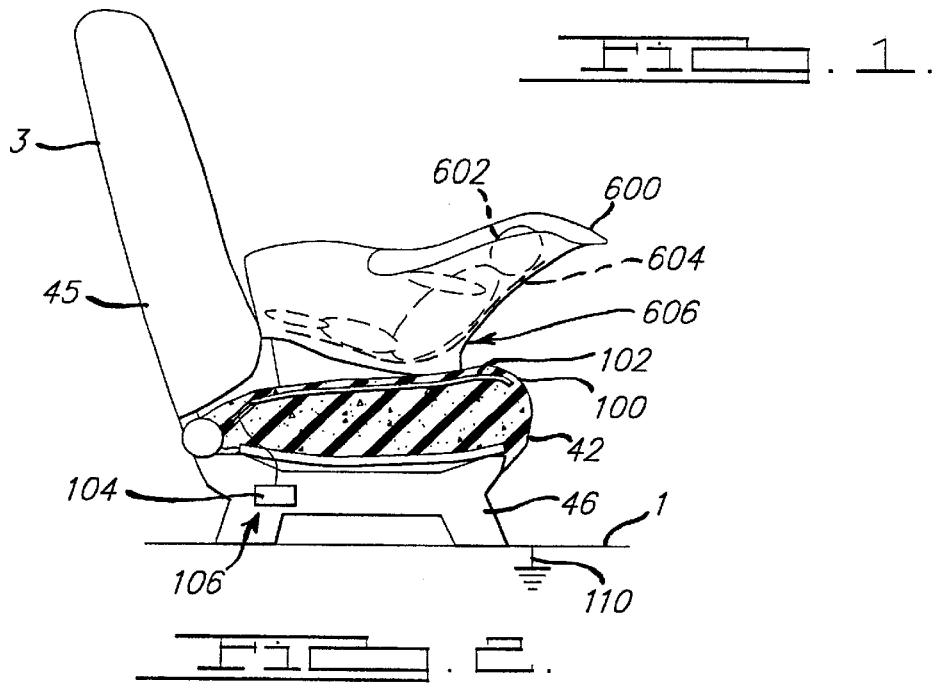
FIG. 2 illustrates a child in a typical rear facing child seat placed on a vehicle seat incorporating a capacitive sensor in accordance with the instant invention.

The occupant sensor 10 is effective in discriminating a rear facing infant seat (RFIS) 600 from an adult because the child 602 in a rear facing child seat never has a large surface of its body very near to the seat bottom 42 and the capacitive sensing pad 102 contained therein. For example, FIG. 2 illustrates the orientation of a child 602 in a typical rear facing child or infant seat 600. The seating contour 604 inside the rear facing infant seat 600 is such that the buttocks of the child 602 are closest to the seat bottom 42 of the vehicle seat 3. Usually there is a significant gap 606, up to several inches, between the child 602 and the seat bottom 42 of the vehicle seat 3. Since child seats 600 are made of plastic, the seats themselves are not sensed directly by the capacitance sensor 100. Even for rear facing infant seats 600 for which the gap 606 between the child 602 and the seat bottom 42 of the vehicle seat 3 is relatively small, the inside seating contour 604 still creates a significant gap between the capacitive sensing pad 102 and all parts of the child 602 except the buttocks. Since only a small portion of the surface of the child 602 is near to the capacitive sensing pad 102, the capacitance measured by the capacitance sensor 100 is relatively low, and more particularly, less than the threshold capacitance, $C_{norm}$.

Figure 3A:
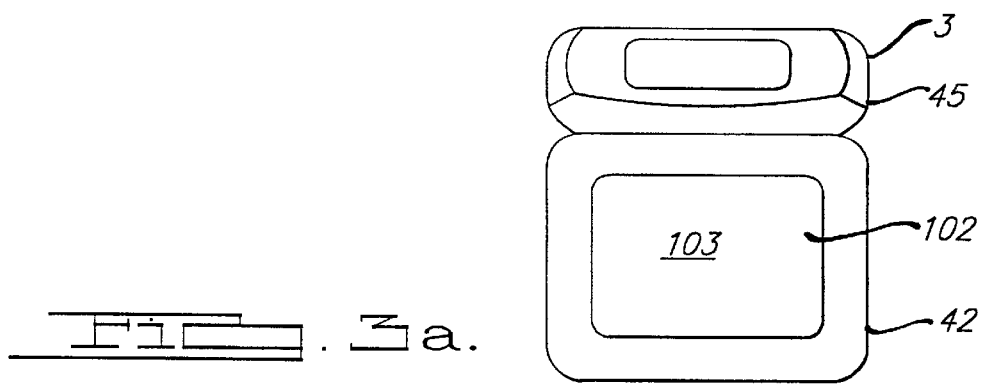

Referring to FIGS. 3a and 3b, the sensitivity to rear facing infant seats of elementary capacitive sensing pad 102 comprising a continuous conductive sheet can be reduced by the modification shown in FIG. 3b, particularly for rear facing child or infant seats 600 that leave only a small gap 606 between the capacitive sensing pad 102.1 and the child 602. Referring to FIG. 3b, the area on the child seat where the gap 606 is small, when the child seat is properly installed, is usually within a zone between 9 and 12 inches from the vehicle seat back 45 and across the entire seat bottom 42. The capacitive sensing pad 102.1 is adapted to make this zone less sensitive than the remaining portion of the capacitive sensing pad 102.1 by removing regions 112 of the electrode 103 within the area of greatest sensitivity. Accordingly, this increases the differentiation between the worst case rear facing child seat signal and the normally seated adult signal. Whereas, for example, rectangular slots are illustrated in FIG. 3b, one of ordinary skill in the art will recognize that the modification to the capacitive sensing pad 102.1 within the zone can be accomplished with a variety of geometries so as provide for a similar effect on the sensitivity pattern of the capacitive sensing pad 102.1. For example FIG. 4 illustrates a plurality of rectangular areas in which the conductor is removed from the electrode 103.

Referring to FIG. 6, alternately, an electric field sensor 100 with a similarly modified sensitivity can be constructed with a plurality of capacitive sensing pads 102 within the seat bottom 42, wherein a first capacitive sensing pad 102 comprising a first electrode 103.1 only senses the zone where the gap 606 between the child and the sensor could be small, and a second capacitive sensing pad 102 comprising a second electrode 103.2 senses the remaining portion of the seat bottom 42. If the total signal is relatively low and is dominated by the signal from the first capacitive sensing pad 102, then the corresponding object on the vehicle seat 3 is likely a rear facing infant seat 600.

The wetting of a seat 3 proximate to an electric field sensor 100 can have a significant effect on the capacitance of the electric field sensor 100 with respect to a circuit ground 110. For example, when the seat cover 43 of a seat 3 becomes wet, the capacitance measurement is affected by two mechanisms. First, the liquid or water itself has a high dielectric constant and increases the capacitance of the capacitive sensing pad 102, which increase is not eliminated by the instant invention. However, the instant invention can compensate for the increase in capacitance resulting from the second mechanism, wherein the water increases the conductivity of the seat cover 43, so that if the wet seat cover 43 is across the capacitive sensing pad 102 and extends close to a grounding point on the vehicle 1 (i.e. seat frame 46) then the seat cover 43 can act like a grounded conductor, even when capacitively coupled to ground. Grounded conductors across the sensor increase the capacitance dramatically. This "grounded wet seat cover" effect can be nearly eliminated if the sensor is operated at high frequencies.

Accordingly, if the capacitance measurement is performed in such a way that objects that react relatively slowly to varying electric fields are not sensed, the grounded wet seat cover problem can be eliminated. Slowly reacting objects include objects that need more than several hundred nanoseconds to fully respond to an electric field. Continuous wave measurement techniques can achieve this by operating at frequencies above approximately 1 Megahertz. Pulsed measurement techniques (i.e. charge transfer techniques) can achieve this by using pulses under approximately 250 nanoseconds long. The significant resistance across a wet seat cover prevents the grounded wet seat cover effect at frequencies above approximately 1 Megahertz.

Even with that effect largely eliminated, there still is the possibility of sensing a liquid—particularly water—that has been absorbed by the seat cushion. Referring to FIG. 5, the sensing electrode 802 of the capacitive sensing pad 102 is shielded from the water in the seat cushion 44 using a driven shield 804 and/or a ground plane 806 under the sensor electrode 802. The driven shield 804 is simply a second conductor under the conductor of the sensing electrode 802 that is driven at the same potential as the sensing electrode 802. The result will be that there is no electric field between the sensing electrode 802 and the driven shield 804. The driven shield 804 eliminates the capacitance sensing capability of the capacitive sensing pad 102 on the side of the sensing electrode 802 where the driven shield 804 is located. The capacitive sensing pad 102 is further improved with a ground plane 806 under the driven shield 804 so that the circuit driving the driven shield 804 drives a consistent load.

As shown in FIG. 5, the driven shield 804 and the sensing electrode 802 are approximately the same size as and essentially cover the entire area to be sensed on the seat 3. Alternately, the elements of the capacitive sensing pad 102 can be distributed sparsely across the seat 3, thereby covering a smaller area than the entire area to be sensed on the seat 3. One of ordinary skill in the art will recognize that the capacitive sensing pad 102, and the elements thereof, can be embodied in a variety of shapes without departing from the teachings of the instant invention.

The capacitance of the capacitive sensing pad 102 relative to circuit ground 105 is relatively small, for example less than about 300 picofarads. The temperature range that is possible in an automotive environment can significantly affect the components of the sensing circuit 106, causing drift that can be erroneously interpreted as a measurement that could enable the safety restraint system 38 to be erroneously enabled by the controller 50. The effects of this drift can be mitigated by incorporating a temperature stable reference capacitor in the sensing circuit 106 that is switched in place of the sensing electrode 103 so as to provide a means for making comparative capacitive measurements. Since the reference capacitor can be selected such that its value is very stable over temperature, any drift can be identified and quantified, and this information can be used to alter the decision threshold.

The output 814 of the voltage follower U1 is then coupled to a second bandpass filter 816 of the same pass band as the first bandpass filter 804, the output of which is detected by a detector 818 comprising diode D1, resistor R3 and capacitor C2, and filtered by a first low pass filter 820. The output 822 of the first low pass filter 820 has a DC component corresponding to the capacitance at the first node 810. This DC component is filtered by blocking capacitor C3, and the resulting signal is filtered by a second low pass filter 824 to provide the amplitude 826 of the oscillating signal at the first node 810, which is related to the total capacitance at that location. The blocking capacitor C3 is adapted so as to provide for a transitory measurement of the amplitude 826.

The capacitive sensing pad 102 is modeled as a first capacitance CS1 in parallel with a series combination of a second capacitance CS2 and a resistance RS, wherein the resistance RS is inversely related to the wetness of the seat. The capacitance of the capacitive sensor is dominated by CS1 for a dry seat, but becomes affected by CS2 and RS as the wetness of the seat increases.

The values of capacitance for capacitors C1, CR1, and CR2 are adapted to maximize the dynamic range of the capacitance measurement over the range of expected capacitances of the capacitive sensor 102.

Other variations of the instant invention are also possible. For example, multiple electrodes or a plurality of pulse lengths or frequencies may be used to make the capacitance measurements. As described hereinabove, the wet seat cover can create a dramatic effect when measurements are made at low frequencies. The wet seat cover can also have a much smaller influence at high frequencies. Both low frequency and high frequency measurements are reliable while the seat is dry. Thus measurements made at both high frequency and low frequency can give an indication of whether the seat is wet (i.e. if the high frequency capacitance measurement is significantly lower than the low frequency capacitance measurement, the seat is wet). If the seat is wet, the high frequency measurement threshold used to make the enable/disable decision can be increased based on the estimated "wetness" of the seat. A wet seat can also be identified using phase information from the sensor. Moreover, the occupant discrimination threshold can be adapted responsive to the degree of wetness detected by the electric field sensor 100.

Referring to FIG. 7, illustrating an exemplary sensing circuit 106, an oscillator 802 generates an oscillating signal, for example a sinusoidal signal, that is filtered by a first bandpass filter 804 so as to create a first oscillating signal 806. The first oscillating signal 806 is applied to a capacitive voltage divider 808 comprising capacitor C1, resistors R1 and R2, and one or more capacitive elements to be measured, selected from the group consisting of the capacitive sensing pad 102, a first reference capacitor CR1, and a second reference capacitor CR2, wherein the capacitive elements to be measured are included or excluded responsive to the states of respective FET switches Q1a, Q1b, Q2a, Q2b, Q3a, and Q3b. Capacitor C1, resistors R1 and R2, and the FET switches Q1a, Q2a, and Q3a—that when active switch in the respective capacitive elements to be measured,—are all connected to one another at a first node 810, which is connected to the input 812 of a voltage follower U1. The output 814 of the voltage follower U1 is connected to FET switches Q1b, Q2b, and Q3b that when active, switch out the respective capacitive elements so as to not be measured. The activation of the FET switch elements of FET switch pairs Q1a and Q1b, Q2a and Q2b, and Q3a and Q3b are respectively mutually exclusive. For example if FET switch Q1a is activated or closed, then FET switch Q1b is deactivated or open. A capacitive element being measured adds to the capacitance at the first node, thereby affecting the strength of the signal at the input 812 to the voltage follower U1. A capacitive element not being measured is disconnected from the first node by its respective first FET switch element, and connected to the output 814 of the voltage follower U1 by its respective second FET switch element, wherein, in accordance with the characteristics of the associated operational amplifier of the voltage follower U1, the output 814 of the voltage follower U1 follows the signal of the first node without that respective capacitive element connected, and voltage follower U1 provides a current through the associated capacitive element through the second respective FET switch element. Moreover, when the respective second FET switch element is activated, the source and drain of the respective first FET switch element are separately coupled to the respective operational amplifier inputs, so that to each is applied the same potential, thereby eliminating the effect of the capacitance of the respective first FET switch on the capacitance measurement.

In operation, a microprocessor U2 controls the activation of FET switches Q1a, Q1b, Q2a, Q2b, Q3a, and Q3b, for example in accordance with the control logic illustrated in FIG. 8. With the first reference capacitor CR1 switched in by microprocessor U2, i.e. with Q2a activated and Q2b deactivated, the controller measures a first amplitude. Then with the second reference capacitor CR2 also switched in by microprocessor U2, the controller measures a second amplitude corresponding to an incremental increase of capacitance at the first node by the capacitance of capacitor CR2. Then the controller computes a sensitivity factor in Volts/picofarad given the known values of capacitance of capacitors CR1 and CR2. Then, the microprocessor U2 switches out the first CR1 and second reference capacitor CR2, switches in the capacitve sensing pad 102, measures a third amplitude, and calculates the capacitance of the capacitve sensing pad 102 using the calculated sensitivity factor. The controller 50 compares this capacitance with a threshold so as to discriminate normally seated occupants from other seat occupancy conditions. Referring to FIG. 7, if a normally seated occupant 5 is present, the restraint actuator 39 is actuated responsive to the detection of a crash by the crash sensor 60. Whereas FIG. 7 illustrates the microprocessor U2 and controller 50 as separate elements that communicate with one another, alternate arrangements are possible. For example, both may be combined in one controller, or the microprocessor may be adapted to sense the amplitude measurements, calculate the capacitance of the capacitive sensing pad, and then output only this capacitance value to the controller 50.

While specific embodiments have been described in detail, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims, and any and all equivalents thereof.

We claim:

1. A vehicle seat, comprising an electrode operatively coupled to said vehicle seat, wherein said electrode is formed with at least one slot or opening such that said electrode at least partially bounds at least one region within said at least one slot or opening that is located proximate to a portion of an occupant selected from an infant or child that is closest to said vehicle seat when the infant or child is seated in an infant seat, a child seat, or a booster seat, and the infant seat, the child seat or the booster seat is placed on said vehicle seat.

2. A vehicle seat as recited in claim 1, wherein said at least one region comprises a plurality of regions.

3. A vehicle seat as recited in claim 1, wherein at least a portion of a boundary of said at least one region extends substantially across said electrode in a lateral direction of said vehicle seat.

4. A vehicle seat as recited in claim 1, wherein said vehicle seat comprises a seat back and a seat bottom, and said at least one region extends between nine and twelve inches from an intersection of said seat back and said seat bottom.

5. An occupant sensor comprising a vehicle seat as recited in claim 1, further comprising:
   a. a sensing circuit operatively coupled to said electrode; and
   b. an oscillating signal applied to said electrode, wherein said sensing circuit measures a response to said oscillating signal.

6. An occupant sensor comprising a vehicle seat as recited in claim 1, further comprising a sensing circuit operatively coupled to said electrode.

7. A vehicle seat, comprising:
   a. a first electrode mounted in said vehicle seat, wherein said first electrode is proximate to a portion of an occupant selected from an infant or child that is closest to said vehicle seat when said occupant is seated in an infant, a child seat, or a booster seat, and the infant seat, the child seat or the booster seat is placed on said vehicle seat;
   b. a second electrode mounted in said vehicle seat, wherein said second electrode is less proximate to said portion of said occupant than is said first electrode, and said second electrode at least partially surrounds said first electrode.

8. A vehicle seat as recited in claim 7, wherein a sensitivity of said first electrode to said portion of said occupant is different from a sensitivity of said second electrode to said portion of said occupant.

9. An occupant sensor comprising a vehicle seat as recited in claim 7, further comprising a sensing circuit operatively coupled to said first and second electrodes.

10. A method of sensing an occupant on a vehicle seat, comprising:
 a. removing a portion of an electrode so as to form a region;
 b. placing said electrode in the vehicle seat so that said region is located proximate to a location on said vehicle seat closest to a portion of an occupant selected from an infant or child when the infant or child is seated in an infant seat, a child seat, or a booster seat, and the infant seat, the child seat or the booster seat is placed on said vehicle seat;
 c. applying an oscillating signal to said electrode; and
 d. detecting a response from said electrode to said oscillating signal.

11. A method of sensing an occupant on a vehicle seat as recited in claim 10, further comprising comparing said response with a threshold, and controlling the actuation of a safety restraint system responsive to said comparison of said response with said threshold.

* * * * *